July 17, 1923.

A. B. DODSON

TRAP FOR CAPTURING ANIMALS

Filed Nov. 15, 1921

1,462,102

WITNESSES

Inventor
ARVY B. DODSON
By
Attorney

Patented July 17, 1923.

1,462,102

UNITED STATES PATENT OFFICE.

ARVY B. DODSON, OF LONGTON, KANSAS.

TRAP FOR CAPTURING ANIMALS.

Application filed November 15, 1921. Serial No. 515,363.

*To all whom it may concern:*

Be it known that I, ARVY B. DODSON, a citizen of the United States, residing at Longton, in the county of Elk and State of Kansas, have invented certain new and useful Improvements in a Trap for Capturing Animals, of which the following is a specification.

The present invention relates to a trap for capturing animals and has for its principal object to provide means whereby the same may be set easily.

Another object of the invention is to provide a trap of this nature which will be simple and efficient in construction, reliable in operation and well adapted to the purpose for which it is designed.

With the above and numerous other objects in view, the invention resides in certain novel features of construction and the combination and arrangement of parts as will be hereinafter more fully described and claimed.

In the drawing:—

Figure 1:
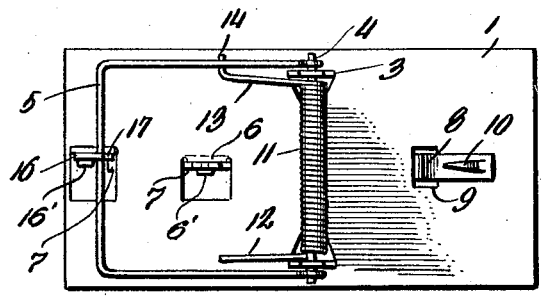
Figure 1 is a top plan view of the trap.

Referring to the drawing in detail it will be seen that 1 designates the platform which is provided with the depending flanges 2 along its edges. A pair of apertured ears 3 are cut from the platform 1 and bent at right angles thereto in the opposite direction from the flanges 2 so as to be spaced from each other and situated adjacent the center of the platform. A pin 4 is mounted in the apertures of these ears 3 and extends a slight distance therebeyond so as to receive the animal engaging element 5 which is in the form of a U-shaped bail having eyes formed at its ends which receive the ends of the pin 4.

An apertured ear 6 is cut from the platform and bent at right angles thereto so as to extend in the same direction with the flanges 2 and has pivoted at 6' thereon the trip arm 7 which is provided with an extension 8 projecting through the aperture 9 in the platform 1. This extension is provided with bait retaining means 10 which consists of a lip cut from the trip arm and bent so as to extend in spaced substantially parallel relation thereto. A coil spring 11 is disposed about the pin 4 between the apertured ears 3 and has one terminal thereof fixed to the platform 1 as at 12 while its other terminal is formed into an arm 13 having an offset finger 14 in engagement with one leg of the bail animal engaging element 5 which normally tends to hold the animal engaging element 5 against the platform at its baited end.

A catch mechanism is provided for holding the animal engaging element 5 in a set position and this mechanism is mounted on an ear 15 cut from the platform 1 and bent at right angles thereto so as to extend in a direction opposite to the flanges 2 and consists of a pivoted dog 16 fulcrumed thereon at 16' and provided with a hooked end 17 that engages the animal engaging element 5. The lower end of the dog 16 is provided with an extension 18 having a notch 19 cut in its end forming a seat for the end of the trip arm 7 and a spring retaining element 20 is adapted to bear against this end of the tripping arm 7 so as to hold it in the notch 19.

Figure 2:
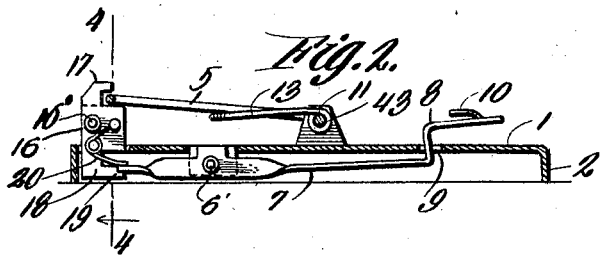
Figure 2 is a longitudinal section taken therethrough.
Figure 3:
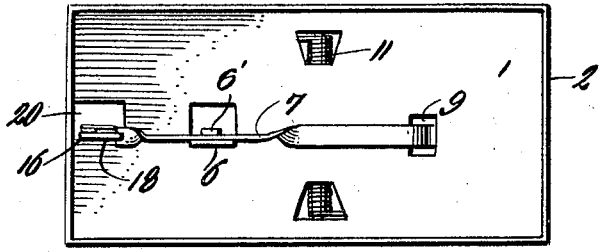
Figure 3 is a bottom plan thereof.
Figure 4:
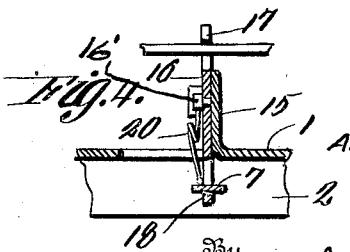
Figure 4 is an enlarged detailed section taken on the line 4—4 of Figure 2 looking in the direction of the arrow.

By a consideration of the drawing and especially Figure 2, it will be seen that should an animal press down upon the extension 8 of the trip arm 7 this would cause the raising of the other end thereof from out of engagement with the notch 19 and causing the same to bear against the spring element 20 so as to fulcrum the dog 16 and disengage the hook end 17 from the animal engaging element 5 and the animal would be caught between the platform 1 and the animal engaging element 5 in a manner as is now common in the art. In order to set the trap the U-shaped bail of the animal engaging element 5 is moved to the position shown in Figures 1 and 2 and the pivoted dog is fulcrumed so that the hook end engages said bail and the spring 20 will cause the end of the trip arm 7 to rest in the notch 19.

Having thus described my invention what I claim as new is:—

In combination, a platform, a spring actuated animal engaging element associated therewith, a trip arm fulcrumed on the platform, a dog fulcrumed on the platform and having one end formed so as to engage the animal engaging element for holding it in an inoperative position and an extension formed on its other end with a notch provided therein for receiving an end of the trip arm, and a spring element mounted on the dog so as to press against the said end of the trip arm so as to normally hold it in the said notch.

In testimony whereof I affix my signature in presence of two witnesses.

ARVY B. DODSON.

Witnesses:
    MAUDE A. CASTOR,
    O. J. VUGAINVOSE.